(No Model.)
L. HEATH.
FERTILIZER DISTRIBUTER.
No. 285,483. Patented Sept. 25, 1883.
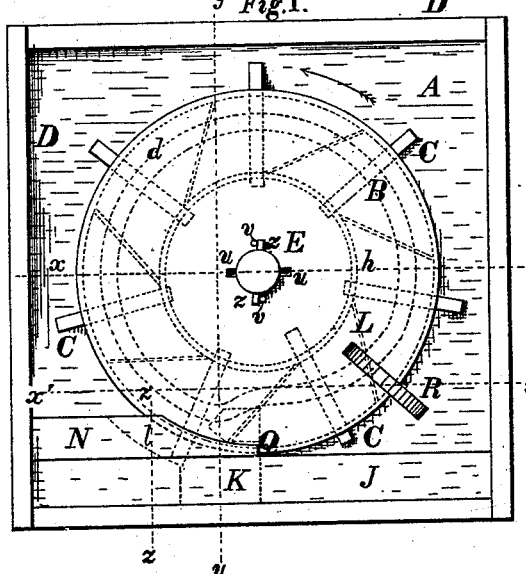
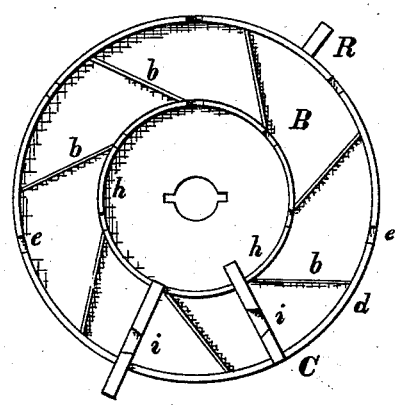
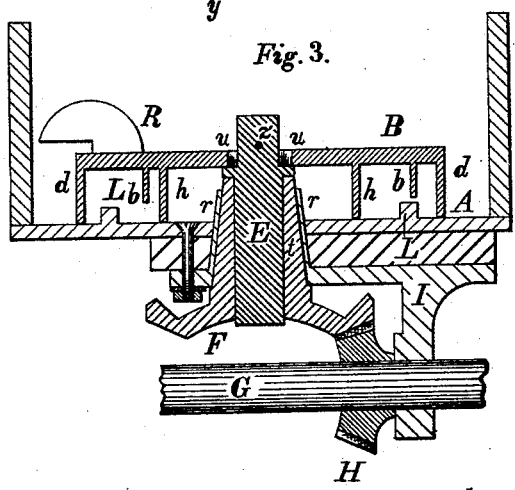
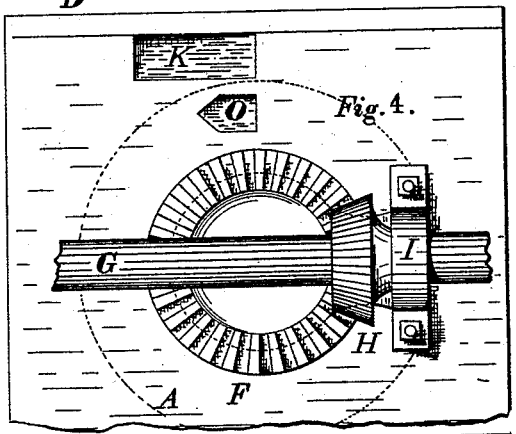
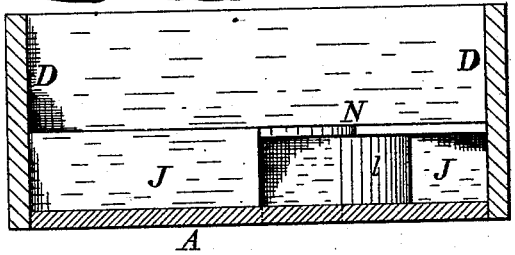
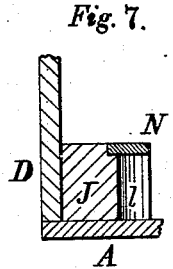
WITNESSES=
H. G. Phillips
Chas Bush
INVENTOR=
Lawrence Heath,
By Geo. B. Selden,
atty

UNITED STATES PATENT OFFICE.

LAWRENCE HEATH, OF MACEDON, ASSIGNOR OF ONE-HALF TO FRANK HEATH, OF ROCHESTER, NEW YORK.

FERTILIZER-DISTRIBUTER.

SPECIFICATION forming part of Letters Patent No. 285,483, dated September 25, 1883.

Application filed March 16, 1883. (No model.)

*To all whom it may concern:*

Be it known that I, LAWRENCE HEATH, of Macedon, Wayne county, New York, have invented certain Improvements in Fertilizer-Distributers, of which the following is a specification, reference being had to the annexed drawings.

My invention relates to certain improvements in fertilizer-distributers, having for its object the production of a simple and cheap device for attachment to grain-drills of the ordinary construction, by which any of the commercial fertilizers may be regularly fed at a uniform rate into the drill-holes when the machine is in operation; and to this end my invention consists in the employment, in a series of cells or a hopper attached to the drill, of rotating feed-wheels having radial feed-slides actuated by a camway, operating in connection with a stationary abutment and feed-opening, to produce the above result.

My invention also consists in certain details of the apparatus, all as hereinafter more fully pointed out and specified.

My improvements in fertilizer-distributers are represented in the accompanying drawings, in which—

Figure 1 is a plan view. Fig. 2 is an inverted view of the feed-wheel. Fig. 3 is a section on the line $x\ x$, Fig. 1. Fig. 4 is an inverted view. Fig. 5 is a section on the line $y\ y$, Fig. 1, showing the parts to the left hand of that line. Fig. 6 is a side view of one of the feed-slides. Fig. 7 is a section on the line $z\ z$, Fig. 1. Fig. 8 is a section on the line $x'\ x'$, Fig. 1, showing the parts below that line, the feed-wheel and slides being omitted.

In the accompanying drawings, representing my improved fertilizer-distributer, A is the base or bottom of the cell or trough, in which the feed-wheel B revolves about a vertical axis. The feed-wheel B is provided with the radially-movable feed-slides C C, which are operated by the camway L on the bed-plate, so as to deliver the fertilizer through the opening K in the bed-plate into a suitable spout or passage, through which it drops into the drill-hoe. The feed-wheel B revolves within the cell with the vertical spindle E, provided at its lower end, beneath the plate, with the beveled gear F, which is operated by the pinion H on the shaft G, driven in any suitable manner from the wheel or wheels of the grain-drill to which my improvement is applied. The shaft G revolves in suitable bearings, I, attached to the lower side of the bed-plate of the machine. The direction of rotation of the feed-wheel is indicated by the arrow in Fig. 1.

The feed-wheel B consists of a circular plate provided with the flanges $d$ and $h$, in the lower edges of which are formed the notches $e\ e$, Fig. 2, through which the feed-slides pass. Any suitable number of feed-slides C C may be employed. Each feed-slide is provided on its lower edge with a notch, $i$, which engages with and fits over the curved camway L, which is made of such a shape that as the feed-wheel revolves the feed-slides are withdrawn radially, so that their outer ends come flush with or slightly within the outer surface of the flange $d$ while they are passing the stationary abutment J, and are afterward forced out again, as represented in Fig. 1. The cell or trough being filled with the fertilizer, the projecting ends of the feed-slides carry a portion of it along with them as the feed-wheel revolves, and deliver it through the opening K in the bottom of the trough. The abutment J fits against the outside of the outer flange, $d$, on the feed-wheel at Q, Fig. 1. The opening K extends from the bottom plate, A, up into the abutment to the same level as the top of the feed-wheel. A guard, N, is fitted to the upper margin of the feed-wheel, being fastened to the abutment or the side walls of the cell or trough in any suitable manner. Below the guard N the abutment is recessed out in a curve, as represented at $l$, Figs. 1, 7, and 8, corresponding with the path described by the outer ends of the feed-slides during this portion of the revolution of the feed-wheel. The guard N projects slightly over the top of the feed-wheel, preventing the fertilizer from falling directly into the curved recess $l$, through which the ends of the feed-slides pass.

The upper surface of the feed-wheel may be either made flat, as represented in the drawings, or it may be made spherical or conical, as preferred. In order to facilitate the removal of the feed-wheel from the spindle E, I insert a pin or pins, z z, into the upper end of the spindle, which pins pass through the notch or notches u u in the sides of the opening made through the feed-wheel for the spindle, and, being thereafter partially rotated, come in contact with the lug or lugs v v on the upper surface of the feed-wheel, so that the motion of the spindle is thereby transmitted to the feed-wheel. This arrangement enables the operator to readily remove and replace the feed-wheel.

The agitator R may be attached to the upper surface of the feed-wheel, which, by its revolution with the wheel, keeps the fertilizer in the trough or cell stirred up, so as to facilitate its discharge by the feed-slides.

I am aware that a horizontal roller has been provided with radially-movable blades extending through the same from side to side, and operated by means of castings acting against their outer ends, and to such construction I lay no claim.

It will be observed as a peculiarity of my device that the material is delivered downward in the direction of the axis of the wheel, instead of being delivered radially from the wheel, as in the structure above referred to.

I claim—

1. The combination, in a fertilizer-distributer, of the horizontal revolving feed-wheel B, provided with a series of radially-movable feed-slides, C C, the base A, located beneath the feed-wheel, and provided with the outlet-opening K, abutment J, and camway L, as described, whereby the delivery of the material is secured in a downward direction at right angles to the direction in which the wheel revolves.

2. The horizontal feed-wheel B, provided with two annular notched flanges, d and h, in combination with the independent radially-movable feed-slides C C and the camway L.

3. The combination, in a fertilizer-distributer, of the feed-wheel B, provided with flanges d and h, a series of radially-movable feed-slides, C C, base A, abutment J, feed-opening K, and the supplementary discharge-port O, substantially as and for the purposes described.

4. The combination, in a fertilizer-distributer, of the feed-wheel B, provided with a series of radially-movable feed-slides, C C, base A, camway L, feed-opening K, abutment J, and guard N, substantially as and for the purposes set forth.

LAWRENCE HEATH.

Witnesses:
FRANK HEATH,
THOMAS G. OUTERBRIDGE.